Feb. 27, 1940.  R. DE FILIPPIS  2,191,907
HYDRAULIC MECHANICAL SPEED TRANSMISSION
Filed April 3, 1937
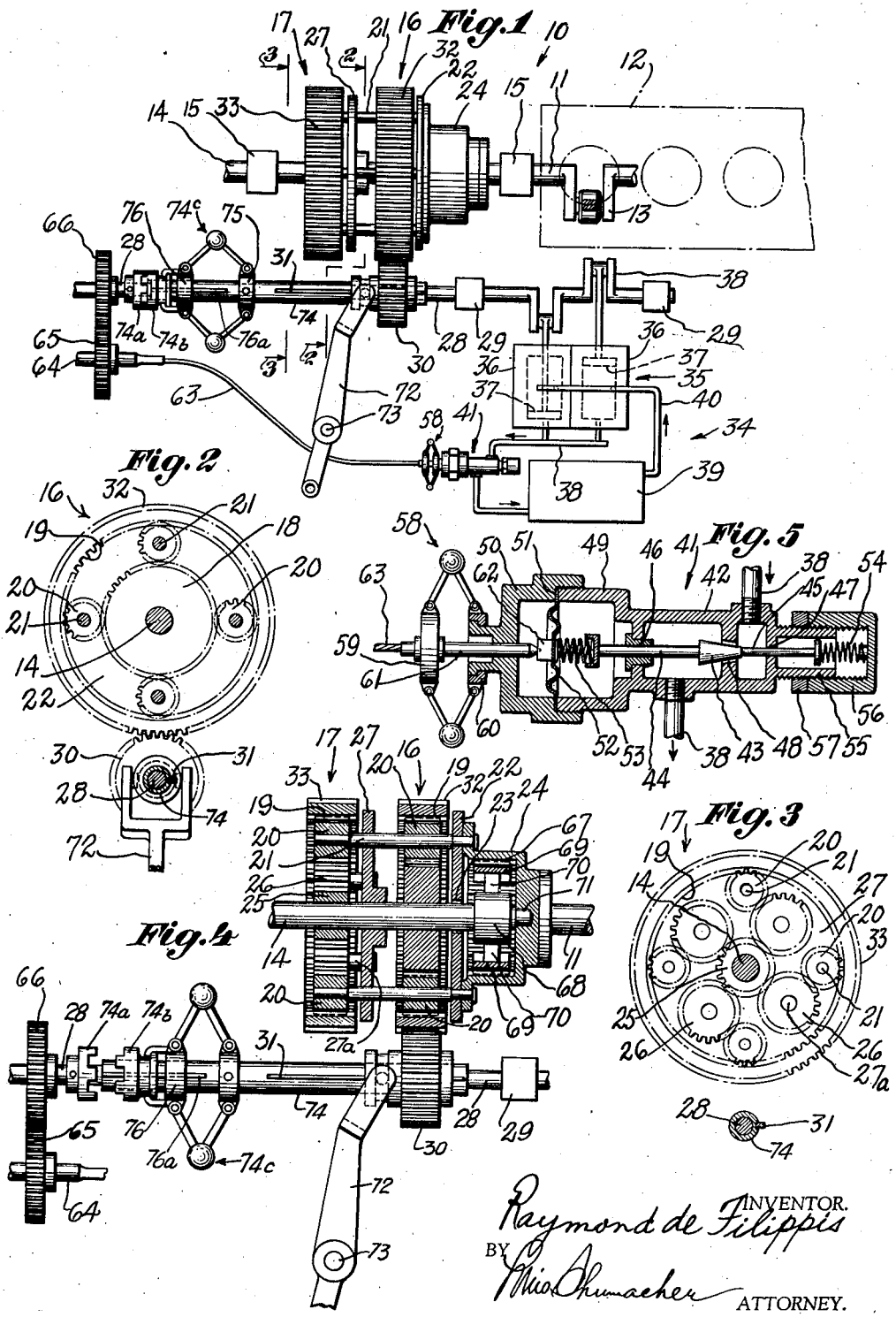
INVENTOR.
Raymond de Filippis
BY
ATTORNEY.

Patented Feb. 27, 1940

2,191,907

UNITED STATES PATENT OFFICE 2,191,907

HYDRAULIC MECHANICAL SPEED TRANSMISSION

Raymond de Filippis, Brooklyn, N. Y.

Application April 3, 1937, Serial No. 134,712

10 Claims. (Cl. 74—293)

This invention relates to transmission devices and has particular reference to automobile transmissions and to other machines which may require that power be supplied thereto in a similar manner.

One object of the invention is to provide a device of the character described which shall be operative to transmit power at varying rates without overloading the power source, and which shall be particularly simple in construction and operation and durable, reliable and highly efficient in use.

Another object of the invention is the provision of a transmission having a planetary gearing or the like, in improved association with a novel means for restraining one of the elements of the planetary gearing, where the means referred to is of a fluid type so as to offer a relatively frictionless resistance.

Another object of the invention is to furnish an improved transmission comprising a pump operative by the transmission drive shaft to feed liquid in a circulatory path past a flow restricting valve, the said valve tending to automatically close and being readily partially openable by liquid pressure, but tending to powerfully close as the transmission, specifically the driven shaft thereof speeds up, to cause the resistance created by said valve to increase and more greatly restrain an element of a planetary gear for the driven shaft of the transmission, whereby the driven shaft approaches the speed of the driving shaft preparatory to a direct connection between the shafts.

A further object of the invention is to provide a transmission of the character referred to combined in an improved manner with means for automatically directly connecting the driving and driven shafts and disengaging the drive for the hydraulic means when the driven shaft attains a predetermined speed.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a plan view showing a device embodying the invention.

Figs. 2 and 3 are vertical sectional views taken on the lines 2—2 and 3—3, respectively, of Fig. 1.

Fig. 4 is a longitudinal sectional view, with parts removed, of the device, and the gear shift lever in a different position.

Fig. 5 is an enlarged horizontal sectional view of the valve control.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device embodying the invention. The same may include a drive shaft 11 that may be rotated by an internal combustion motor 12, as by a crank means 13. Alined with the drive shaft 11 is a driven shaft 14. Bearings for the respective shafts may be provided at 15.

Interengaging the drive shaft 11 with the driven shaft 14 is a planetary gear unit 16, which may be used for rotating the driven shaft in what may be termed the normal forward direction. If desired, a second planetary gear unit 17 may interengage the drive shaft 11 with the driven shaft 14 for a reverse drive of the driven shaft.

The planetary gear unit 16 may include a central gear 18 fixed on the driven shaft 14, an annular internally toothed gear 19 which may be an idler, and a series of spaced pinions 20 between and interengaging the gears 18 and 19. The pinions 20 may be rotatably mounted on pins or shafts 21 that are fixed to a disc or plate 22 disposed alongside of the gears 18, 19 and 20, and having a central aperture 23 for the free passage of the driven shaft 14. Said disc 22 may be secured to a casing 24 which may be suitably fixed to the drive shaft 11. It will be readily seen that the unit 16 is adapted to function in the manner of a conventional planetary gearing.

The unit 17 is in general similar to the unit 16, except that the central gear 18 of the latter is replaced by a smaller central gear 25, and a series of gears 26, rotatably mounted at 27a on the companion disc plate 27, interengage the gear 25 with the pinions 20. Thus it will be perceived that the unit 17 differs from the unit 16 solely in certain conventional changes for producing a different direction of rotation of the driven shaft 14.

In order to render the disc 27 rotatable by the drive shaft 11, the shafts 21 are common for both units 16 and 17, with the respective pinions 20 being in alined relation. Hence the shafts 21 may be reenforcingly secured to both discs 22 and 27. All gears may be of the so called spiral type for noiseless operation.

To cause either of the planetary gear units 16 and 17 to transmit power from the driving shaft 11 to the driven shaft 14, instead of merely idling, it is necessary to restrain one of the gear elements of the respective units, it being clear that the speed of power transmission varies with the reduction in speed of such gear element, and is a maximum when the gear element referred to is stationary. To cause such restraining effect, I prefer to utilize a fluid power system, arranged in a circulatory manner, the system being operated as by the gear 19 of the unit 16 or 17 according as the driven shaft is to be rotated in forward or reverse, and the coordination permitting the fluid power system to oppose a variable force to the rotation of the gear 19 depending upon the speed of the driven shaft 14. In a broad sense, the fluid power system operates in response to a difference in speed between the gear 19 and one of the gears associated therewith. Thus the fluid power system may be stationary or movable, as may be desired; for example, it may be mounted on a disc 22 and driven by one of the shafts 21, but preferably the stationary arrangement is used.

Accordingly, I provide a countershaft 28 journaled in bearings 29 and carrying a pinion 30 which is engaged by a spline 31 on the shaft 28. Thus the pinion 29 is nonrotatably slidable along the shaft 28, so as to engage the external gear portions 32 or 33 of the gears 19 for the respective units 16 and 17. The countershaft 28 may actuate a fluid pump or compressor 34 of the rotary or reciprocatory type, desirably the latter. The compressor 34 may form part of a fluid ciculatory system 35.

More specifically, the compressor 34 may include one or more conventional reciprocatory pump units each having a cylinder 36 and a piston 37 connected to a crank portion 38 of the countershaft 28. These pumps may discharge into a manifold 38 which leads into a storage tank 39, a return line 40 supplying the fluid from the tank to the intake ports of the pumps to thus complete the circulatory system 35. The flow of the fluid may be always in the same direction, and oil may be used as a fluid, and the pumps may have their well known individual valves (not shown), so that the compressor 34 may maintain a constant pressure against the resistance of the line 38 or 40.

If it be desired that the system 35 interpose a variable resistance to cause the operation of a planetary gearing, the speed of or the resistance in the system 35 may be varied aside from the variation due to the speed of a planetary gear element. Thus I may provide a valve 41 in the manifold 38, operative to suit. The valve 41 may, illustratively, include a housing 42 and a valve element 43 that may be of the tapered or needle type for a fine control. Said valve element may be fixed on upper and lower stem portions 44, 45 guided in the housing at 46, 47 to maintain the valve element in accurate alinement with its tapered seat 48. The stem portion 45 may be thinner than that at 44 so as not to obstruct the seat 48.

The valve element 43 is arranged so as to tend to automatically move downward into closing position, and the casing 42 is arranged so that no stuffing boxes shall be required at the valve stem to frictionally retard the valve. Hence the casing 42 may include an annular external flange 49, upon which may be screw threaded a cap 50, that encloses the upper end of the stem portion 44. Between the rim of the flange 49 and an annular shoulder 51 of the cap is secured the edge of an annularly corrugated spring disc 52. The latter constitutes a seal and may engage the upper end of the stem portion 44, as by means of an expandible coil spring 53. The several parts are all alined with the stem portion 44, and the spring action of the parts 52, 53 serves to close the valve element 43.

In order to vary the power of the springs 52, 53, an expandible coil spring 54 may act upon the lower stem portion 45 to tend to open the valve element 43. The casing 42 may have an external annular flange 55 having a running thread for an adjustable engagement of the cap 56, which may be secured fluidtight by a locknut 57. The spring 54 is housed at its lower end in the cap 56, and by setting the cap 56 the tension of the spring 54 may be adjusted.

In lieu of, or in association with the spring means for controlling the valve element 43, I may provide means such as a governor 58 indirectly responsive to the speed of the driven shaft 14 through the medium of the countershaft 28, for suitably varying or closing the valve element 43. The governor 58 may be the conventional ball type operated by centrifugal force and may include a pair of alined rotary collars 59, 60, the former being axially movable and the later being axially fixed. A shaft 61 may be fixed to the collar 59 and may extend through a central hole in the cap 50, with its end bearing down upon a bearing element 62 that may be centrally affixed to the diaphram 52. Now, when the balls of the governor 58 fly out, the rotary shaft 61 is moved downward to exert a force on the springs 52, 53, so as to supplement the closing force to which the valve element 43 is being subjected. The governor 58 may be rotated as by a flexible cable 63 that is connected to the shaft 64 of a gear 65 which engages a gear 66 that is fixed to the countershaft 28.

The nature of the invention as specifically applied to an automobile transmission will now be described. It is intended that the planetary gear and hydraulic system shall be used to speed up the driven shaft 14 from rest, and that when the latter attains a sufficiently high speed, any suitable well known means shall automatically direct connect the driving shaft 11 with the driven shaft 14 to relieve the planetary gearing of its load. By way of illustration, the housing 24 may have an internal annular gear 67, and a clutch element 68 may be fixed to the driven shaft 14. This clutch element may comprise spaced toothed shoes 69 for engaging the gear or toothed portion 67 in response to centrifugal force. The shoes 69 may be mounted on radial arms 70 that are normally retracted by the clutch part 68. The driven shaft 14 may have its end journaled at 71 in the casing 24 so that vibration may be avoided.

Coincident with or somewhat subsequent to the engagement of the clutch 24, 68, it is desirable that the gear 30 shall automatically disengage, so that the system 34 shall not operate. This problem is allied with the shifting of the gear 30 for forward and reverse driving. Such shifting may of course be manually effected as by a conventional forked lever 72 that is pivoted at 73, and may be remote controlled as may be desired.

For automatic disengagement of the gear 30, I may provide that the spline 31 be mounted on a hollow shaft 74 which slidably carries the gear 30 and is sleeved on the shaft 28. A clutch element 74a is fixed to said shaft 28, and a companion clutch element 74b sleeved on the hollow shaft is controlled by a governor 74c, so that when the balls of the governor fly out the element 74b is retracted to the right out of engagement with the element 74a. When this occurs, the hollow shaft 74 idles on the shaft 28, and with it the gear 30 is idle. The latter may be moved axially without affecting the position of the clutch element 74b which is controlled by the governor. When the clutch elements are interengaged, the hollow shaft is locked to the shaft 28. The governor may comprise a collar 75 fixed to the hollow shaft and a collar 76 suitably engaged to the clutch element 74b and slidable therewith on the hollow shaft. The hollow shaft may be suitably secured against axial movement. The elements 74b and 76 may be non rotatably engaged with the hollow shaft as by a spline 76a on the latter.

In operation, with the gear 30 set in engagement with the planetary gear unit 16 for forward driving, and the valve element 43 normally closed, the operator starts the motor 12. This initiates rotation of the disc 22, causing the pinions 20 to revolve and rotate, and hence to rotate the gear 18, and therefore the driven shaft 14. This operation of the planetary gearing occurs because the gear 30 is caused to rotate by the gear 32, so as to rotate the shaft 28 and cause operation of the pump unit 34 of the circulatory system 35. As this operation begins the valve element 43 may partially open quite readily, the liquid acting upward against the conical face of the valve element. Hence the valve element 43 permits the liquid to circulate, so that the gears 30, 32 rotate but at a reduced speed, and hence the driven shaft 14 is rotated but at a substantially less speed than the drive shaft 11. Thus the motor 12 is prevented from stalling. As the motor speeds up somewhat, the fluid pressure in the system 35 increases greatly, and the springs for closing the valve element 43 yield to permit further opening of the latter. The speed of the driven shaft 14 now increases in proportion to the setting of the springs. As the motor 12 further increases in speed, the governor 58 begins to operate to substantially close the valve element 43, so that the driven and drive shafts are practically at the same speed, and the clutch 24, 68 directly connects said shafts, while the governor 74c disengages the gear 30 from the shaft 28 so that the system 35 stands idle. Should the motor 12 slow down, the operation described will be reversed, and the unit 16 will be again engaged with the hydraulic system 35.

I claim:

1. A device including a driving shaft, a driven shaft, a planetary gearing interconnecting said shafts, a circulatory hydraulic system including a pump, drive means connecting said pump to an element of the planetary gearing so that the pump resists rotation of said element to cause the planetary gearing to transmit power from the driving to the driven shaft, the hydraulic system including a flow control valve adapted to be opened by pressure caused by the pump, means tending to close said valve, including a governor responsive to the speed of said element, means for automatically directly connecting the driving and driven shafts when the latter attains the speed of the driving shaft, and means for disconnecting said drive means from said element only when the driving and driven shafts are directly connected to each other, including a governor responsive to the speed of said drive means of the pump.

2. A device including a driving shaft, a driven shaft, a planetary gearing interconnecting said shafts, a circulatory hydraulic system including a pump operatively connected to a drive element of the planetary gearing, the hydraulic system resisting rotation of said element to cause the planetary gearing to transmit power to the driven shaft, the hydraulic system including a flow control valve that is normally urged toward closed position, said valve being responsive to pump pressure to move toward open position, a governor responsive to the speed of said element to cause the valve to interpose a higher or lower resistance according as the speed of said element is higher or lower, means for direct connecting the driving and driven shafts to each other, and means including a governor responsive to the speed of said element for causing the pump to be connected or disconnected from said element, the second mentioned governor being operative upon directly connecting the driving and driven shafts to each other.

3. A device including driving and driven shafts, a planetary gearing interconnecting said shafts, a circulatory hydraulic system including a pump, a valve for said system, drive means engaging said pump with an element of the planetary gearing so that the pump interposes a resistance to rotation of said element to cause rotation of the driven shaft by the planetary gearing, a governor responsive to the speed of said element so as to engage and disengage the pump drive means with respect to said element, means for directly releasably interconnecting the driving and driven shafts upon attainment of a required speed by the latter and upon disengagement of the pump drive means, and a second governor operated by and responsive to the speed of the pump drive means to cause the valve to tend to close said hydraulic system in accordance with an increase in speed of the pump drive means.

4. A device including driving and driven shafts, means interengaging the same including an idler element such that said means is operative to transmit power to the driven shaft only according to the retardation of the idler element, a hydraulic circulatory system including a pump connected to said element so as to resist movement thereof, said hydraulic system having a valve openable in response to pump pressure, spring means resisting opening movement of the valve so that the opening movement is generally proportional to the resultant speed of the driven shaft, a centrifugal governor responsive to the speed of said element to cause substantial closure of the valve as the speed of the driven shaft approaches that of the driving shaft, and means for automatically directly connecting the driving and driven shafts when the driven shaft attains substantially the speed of the drive shaft.

5. A device including a driving shaft, a driven shaft, a planetary gearing interconnecting said shafts, a circulatory hydraulic system including a pump operatively connected to a drive element of the planetary gearing, the hydraulic system resisting rotation of said element to cause the planetary gearing to transmit power to the driven shaft, the hydraulic system including a flow control valve that is normally urged toward closed position, said valve being responsive to pump pressure to move toward open position, a governor responsive to the speed of said element to cause the valve to interpose a higher or lower resistance according as the speed of said element is higher or lower, means for directly connecting the driving and driven shafts to each other, and means including a governor responsive to the speed of said element for causing the pump to be connected or disconnected from said element, the second mentioned governor being operative upon directly connecting the driving and driven shafts to each other, and a spring tending to close said valve, the first mentioned governor being of the centrifugal type and supplementing the spring for causing substantial closure of said valve more powerfully than the spring as the driven shaft approaches the speed of the driving shaft.

6. A device including a driving shaft, a driven shaft, releasable means for directly interconnecting the same, a planetary gearing comprising a gear on each of said shafts, an idler gear engaging one of said gears, said gears being revoluble, and means including disconnectible stationary hydraulic means operating in response to a relative angular movement between the idler gear and one of the other gears, said hydraulic means serving to restrain said relative movement whereby the gears transmit motion from the driving to the driven shaft, the second mentioned means including means for variably controlling the operation of the hydraulic means according to the speed of said idler gear, so that the pressure generated by the hydraulic means increases but at a substantially lesser rate than the rate of increase in the speed of the driven shaft.

7. A device including a driving shaft, a driven shaft, a planetary gearing interengaging said shafts, comprising a gear on each of said shafts, an idler gear engaging one of said gears, said gears being revoluble, and means including hydraulic means operating in response to a relative angular movement between the idler gear and one of the other gears, said hydraulic means serving to restrain said relative movement whereby the gears transmit motion from the driving to the driven shaft, the first mentioned means including means for variably controlling the operation of the hydraulic means according to the speed of the idler gear of the planetary gearing, and means responsive to the relative speeds of the driving and driven shafts for direct connecting said shafts and for rendering the hydraulic means inoperative.

8. A device including a driving shaft, a driven shaft, a planetary gearing interconnecting said shafts, a circulatory hydraulic system including a pump, drive means connecting said pump to an element of the planetary gearing so that the pump resists rotation of said element to cause the planetary gearing to transmit power from the driving to the driven shaft, the hydraulic system including a flow control valve adapted to be opened by fluid pressure, means tending to close said valve, including a governor responsive to the speed of a drive element of the planetary gearing, means for automatically directly connecting the driving and driven shafts when the latter attains the speed of the driving shaft, and means for disconnecting said drive means from said element only when the driving and driven shafts are directly connected to each other, including a governor responsive to the speed of said drive means of the pump.

9. A device including driving and driven shafts, means interengaging the same including an idler element such that said means is operative to transmit power to the driven shaft only according to the retardation of the idler element, a hydraulic circulatory system including a pump connected to said element so as to resist movement thereof, a governor responsive to the speed of said element so as to engage and disengage the pump drive means with respect to said element, said hydraulic system having a valve opening in response to pump pressure, spring means resisting opening movement of the valve so that the opening movement is generally proportional to the resultant speed of the driven shaft, a centrifugal governor responsive to the speed of said element to cause substantial closure of the valve as the speed of the driven shaft approaches that of the driving shaft, and means for automatically directly connecting the driving and driven shafts when the driven shaft attains substantially the speed of the drive shaft.

10. A device including driving and driven shafts, means interengaging the same including an idler element such that said means is operative to transmit power to the driven shaft only according to the retardation of the idler element, a hydraulic circulatory system including a pump connected to said element so as to resist movement thereof, said hydraulic system having a valve opening in response to pump pressure, spring means resisting opening movement of the valve so that the opening movement is generally proportional to the resultant speed of the driven shaft, and means for automatically directly connecting the driving and driven shafts when the driven shaft attains substantially the speed of the drive shaft.

RAYMOND DE FILIPPIS.